(12) United States Patent
Mizumura et al.

(10) Patent No.: US 8,001,819 B2
(45) Date of Patent: Aug. 23, 2011

(54) PIERCING METHOD AND PIERCING APPARATUS USING HYDROFORMING AND HYDROFORMED PART AND STRUCTURE

(75) Inventors: Masaaki Mizumura, Tokyo (JP); Koichi Sato, Tokyo (JP); Yukihisa Kuriyama, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 62 days.

(21) Appl. No.: 12/311,752

(22) PCT Filed: Oct. 26, 2007

(86) PCT No.: PCT/JP2007/071360
§ 371 (c)(1),
(2), (4) Date: Apr. 10, 2009

(87) PCT Pub. No.: WO2008/050911
PCT Pub. Date: May 2, 2008

(65) Prior Publication Data
US 2010/0031722 A1    Feb. 11, 2010

(30) Foreign Application Priority Data

Oct. 27, 2006  (JP) .................................. 2006-293158

(51) Int. Cl.
*B21D 35/00*  (2006.01)
*B21D 26/02*  (2011.01)
(52) U.S. Cl. ................... 72/55; 72/58; 72/61; 29/421.1; 29/515; 29/522.1
(58) Field of Classification Search ............... 72/54, 56, 72/58, 61, 55; 29/421.1, 432, 505, 515, 520, 29/522.1
See application file for complete search history.

(56) References Cited

U.S. PATENT DOCUMENTS

| 6,216,330 B1 * | 4/2001 | Valin ........................... 29/522.1 |
| 6,442,820 B1 | 9/2002 | Mason |
| 7,685,690 B2 * | 3/2010 | Ghiran ........................ 29/421.1 |

FOREIGN PATENT DOCUMENTS

JP    35-3814    3/1960

(Continued)

OTHER PUBLICATIONS

International Search Report dated Dec. 25, 2007 issued in corresponding PCT Application No. PCT/JP2007/071360.

(Continued)

*Primary Examiner* — David B Jones
(74) *Attorney, Agent, or Firm* — Kenyon & Kenyon LLP

(57) ABSTRACT

The present invention was made with the object of eliminating the short pipe member when attaching a bolting nut to a hydroformed part, preventing an increase in the difficulty of hydroforming for attaching the nut, extending the nut length so as to enable sufficient strength at the time of bolting, and enabling application even to thin wall hydroformed parts and comprises inserting a metal pipe into a split mold having a pierce punch able to be moved perpendicular to an axis of the inserted metal pipe or in a slanted direction, having a front part narrower than a center part, and having around the front part a nut having an inside diameter larger than an outside diameter of the front part and smaller than an outside diameter of the center part; hydroforming it; then making the pierce punch advance to pierce part of the hydroformed part and pushing the nut by a center part arranged behind the nut and embedding the nut in the metal pipe.

11 Claims, 18 Drawing Sheets

FOREIGN PATENT DOCUMENTS

| | | |
|---|---|---|
| JP | 35-34116 | 12/1960 |
| JP | 7-139532 | 5/1995 |
| JP | 2001-99125 | 4/2001 |
| JP | 2001-300655 | 10/2001 |
| JP | 2002-45926 | 2/2002 |
| JP | 2003-334625 | 11/2003 |
| JP | 2005-297060 | 10/2005 |

OTHER PUBLICATIONS

Canadian Office Action in Canadian Application No. 2,667,269 dated Jul. 9, 2010.

Office action issued Mar. 28, 2011 in the counterpart Canadian Application No. 2,667269.

* cited by examiner

Fig.2
(a)
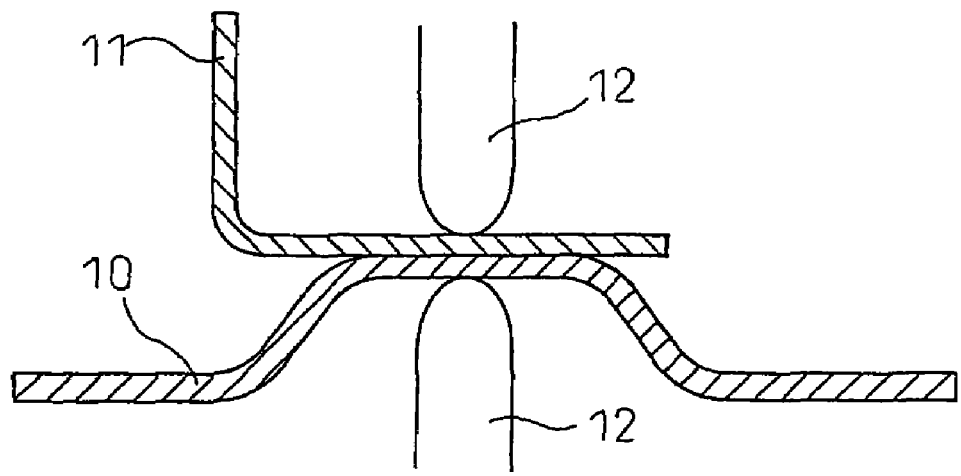
(b)
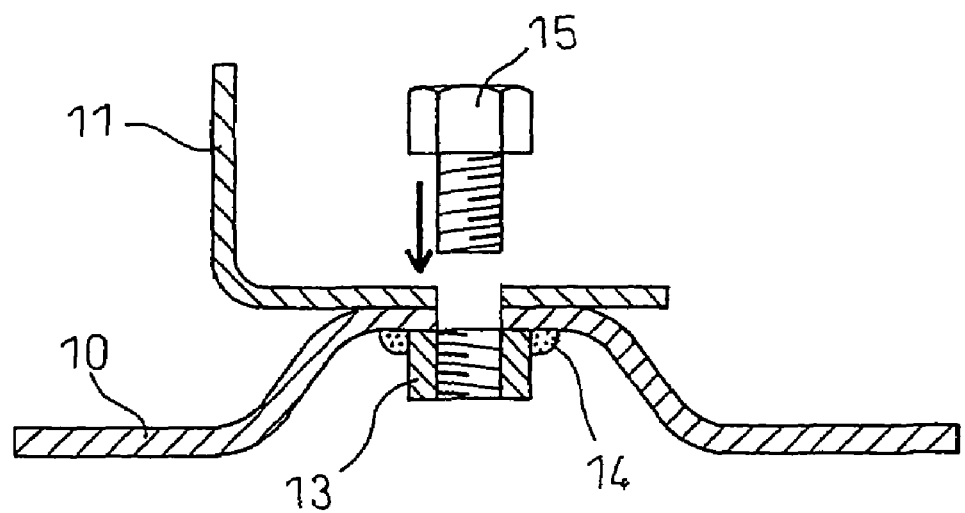

Fig. 6
(a) 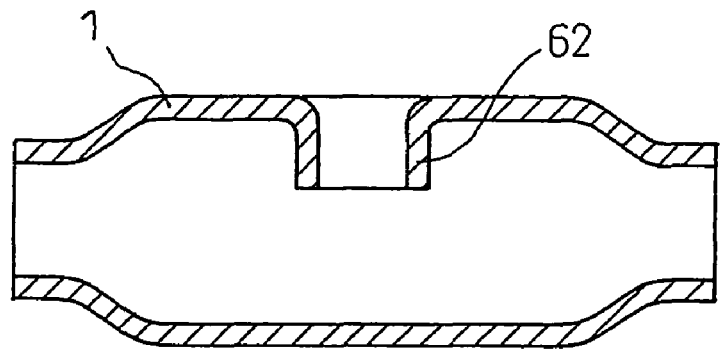
(b) 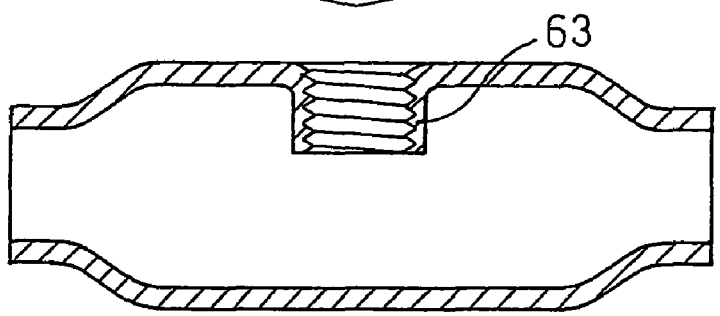
(c) 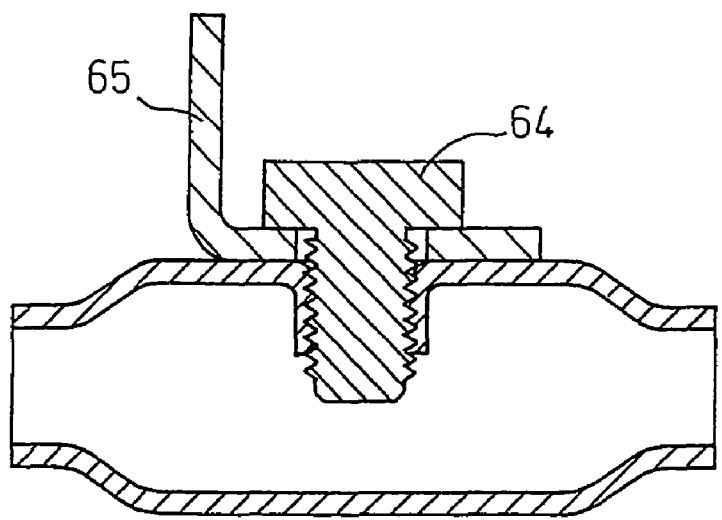

Fig.8
(a)
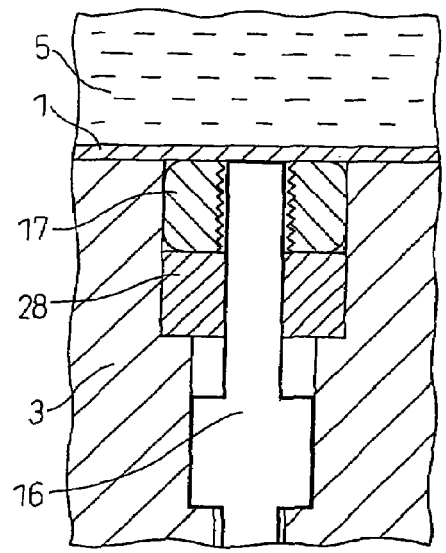
(b)
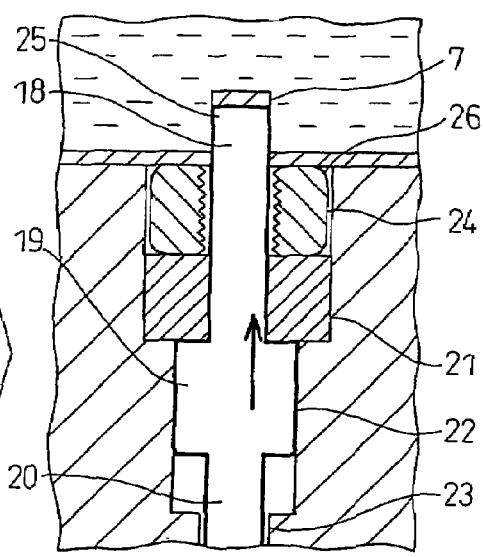
(c)
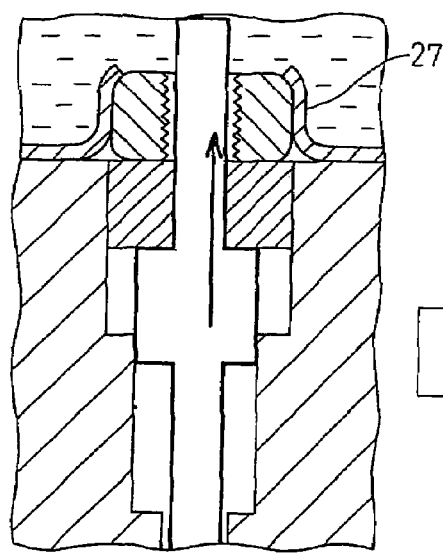
(d)
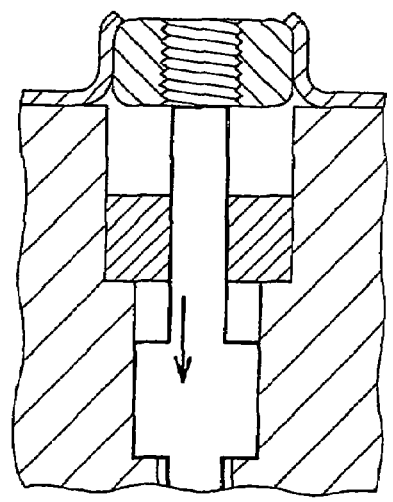

Fig. 9
(a)
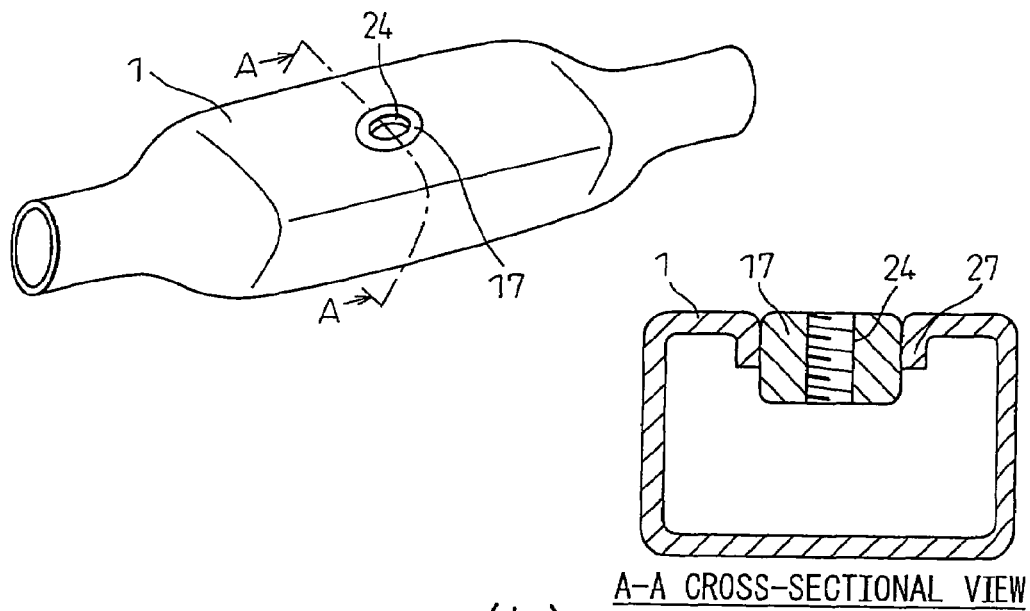
A-A CROSS-SECTIONAL VIEW
(b)
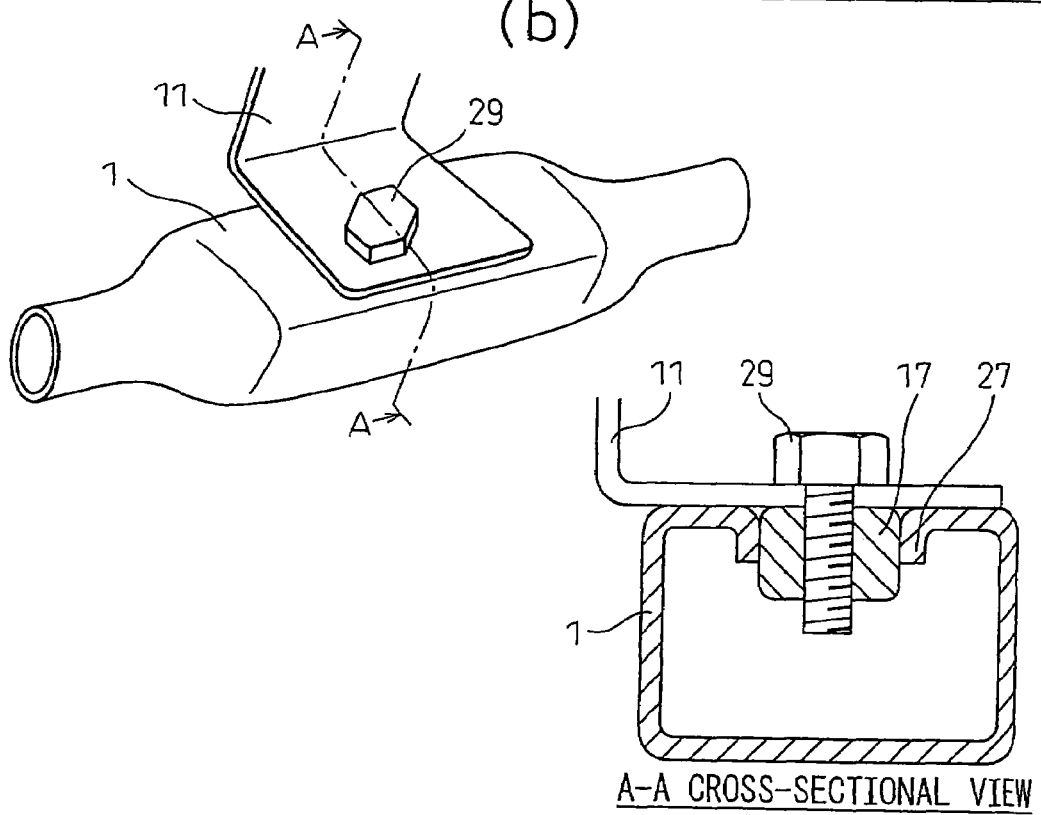
A-A CROSS-SECTIONAL VIEW Fig.10
(a)
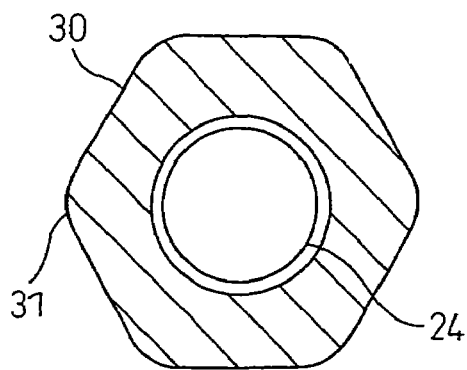
(b)
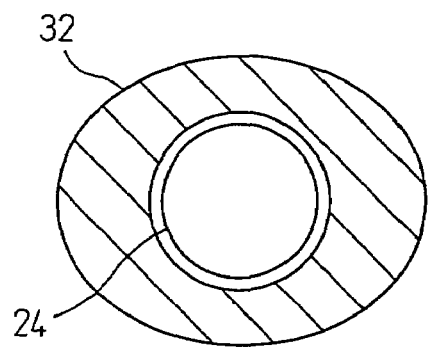
(c)
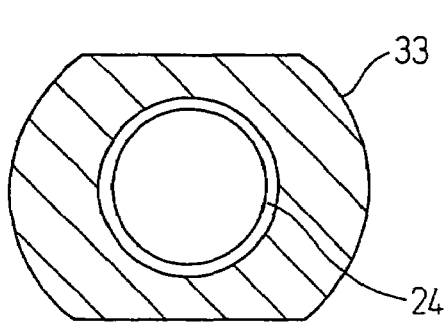
(d)
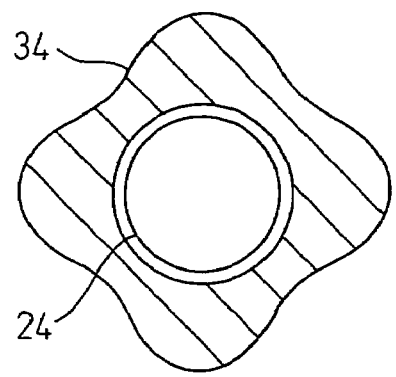

Fig.11
(a)
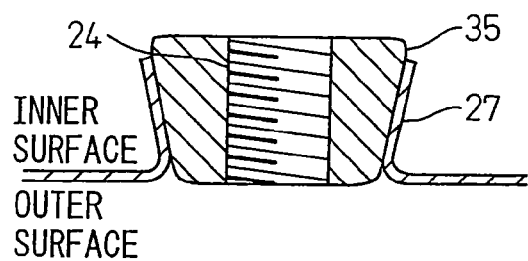
(b)
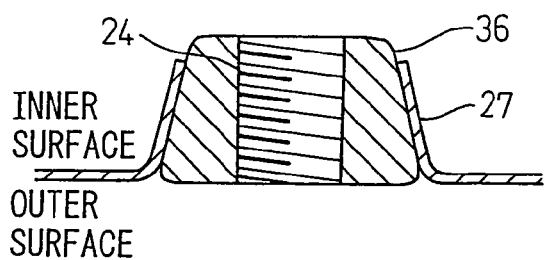
(c)
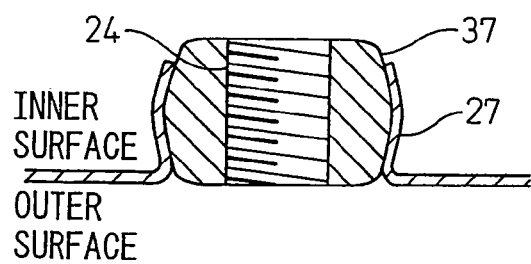
(d)
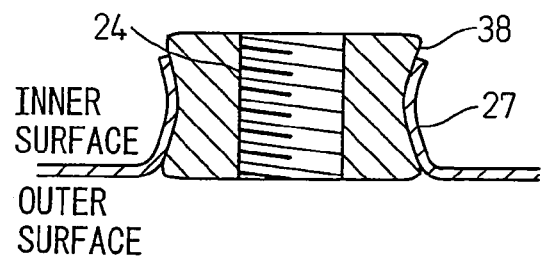
(e)
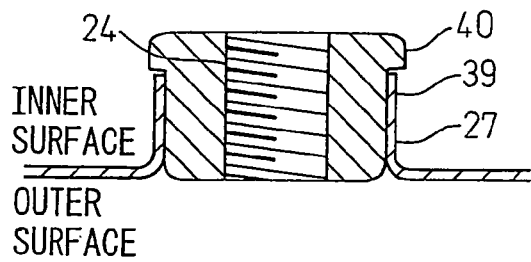
(f)
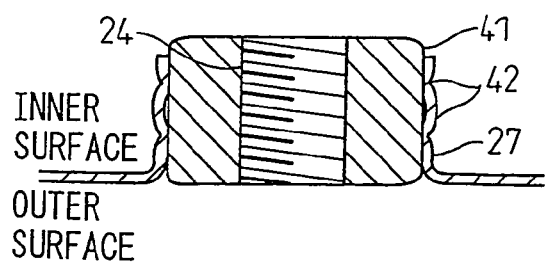

Fig.12
(a)
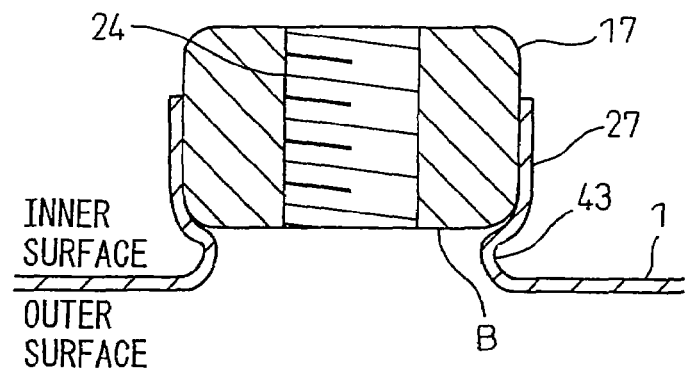
(b)
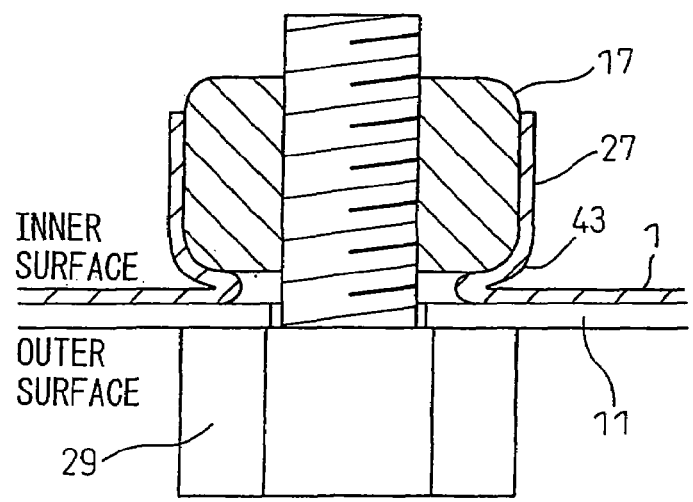
Fig.13
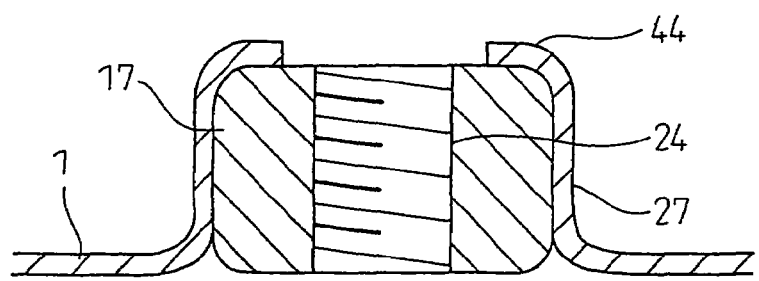

Fig.14
(a)
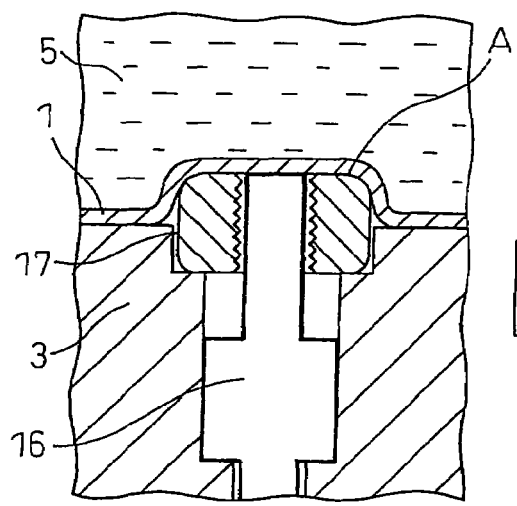
(b)
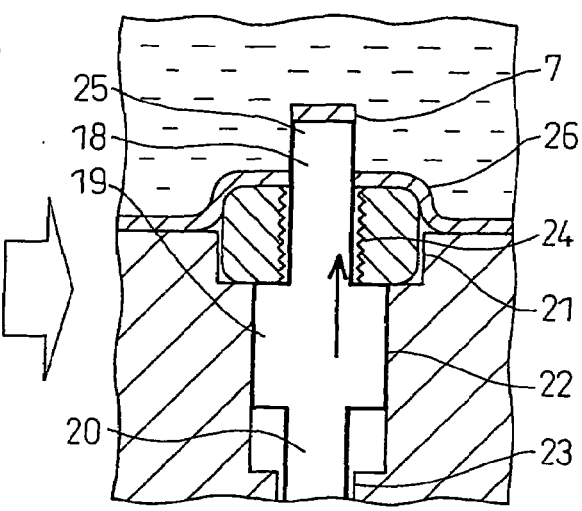
(c)
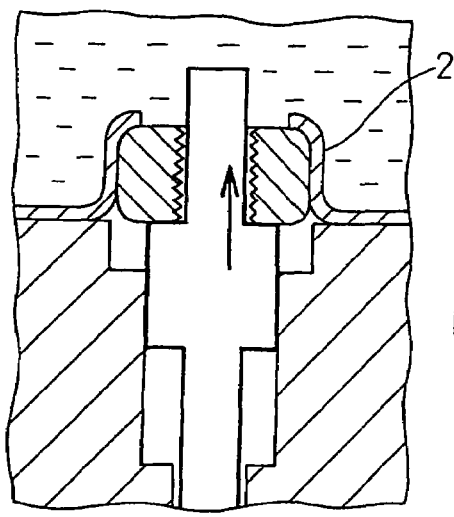
(d)
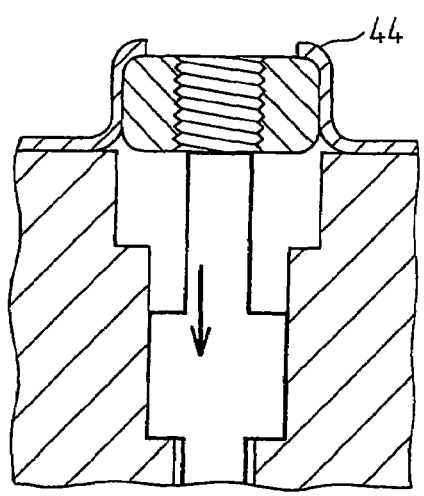

Fig.15
(a)
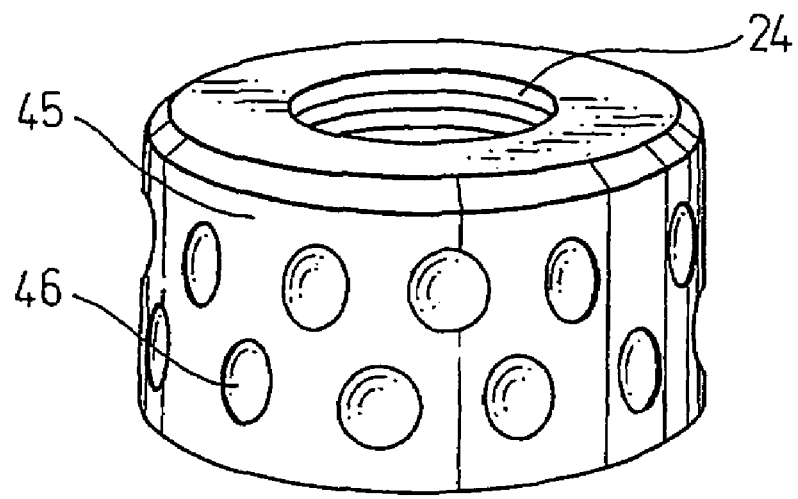
(b)
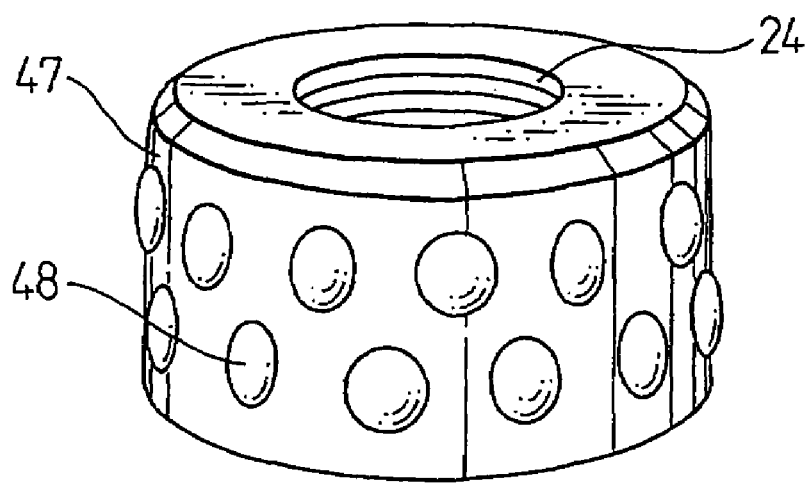

Fig.16
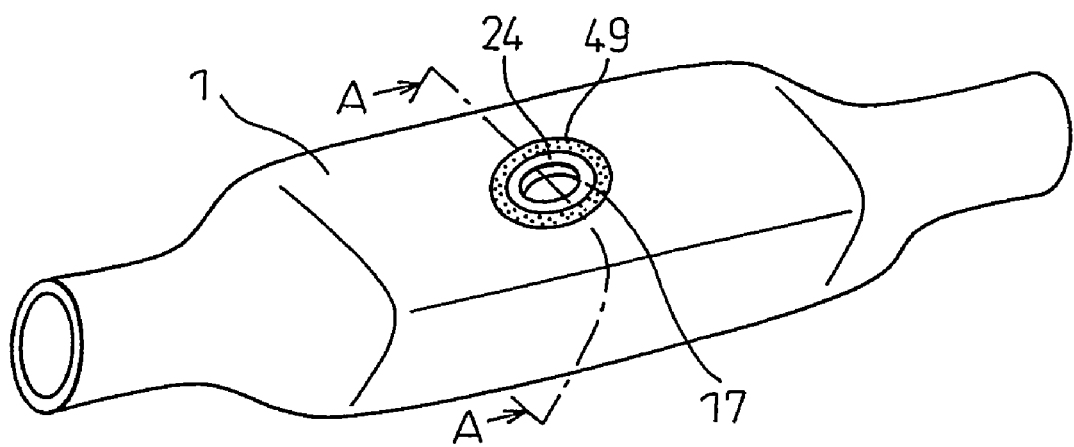
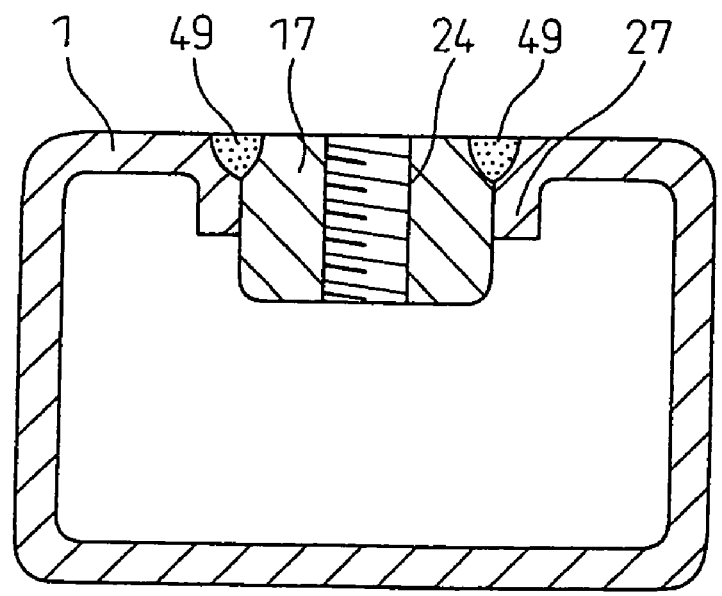

Fig.19
(a)
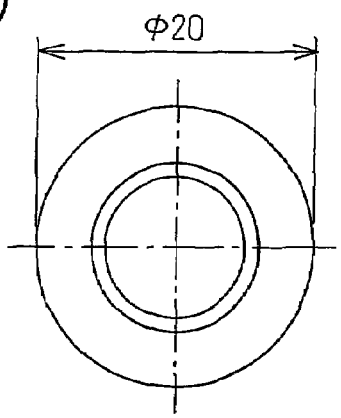
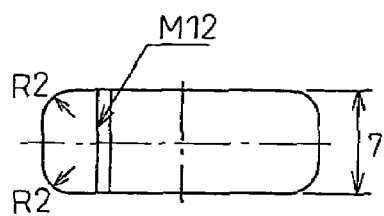
(b)
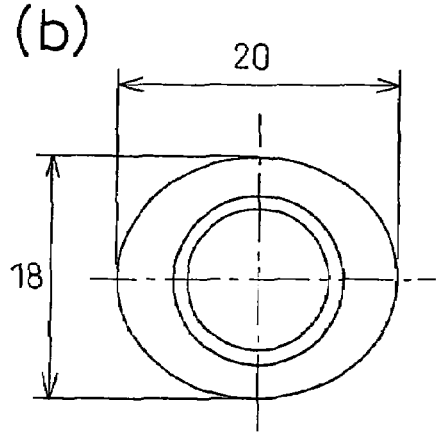
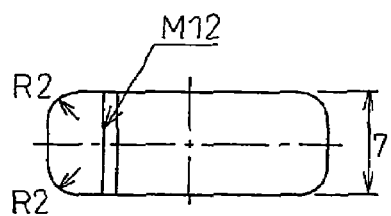
(c)
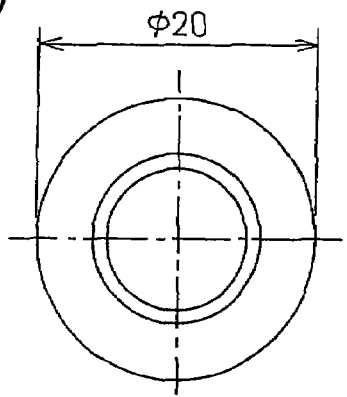
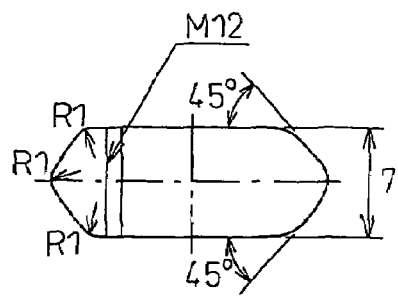
(d)
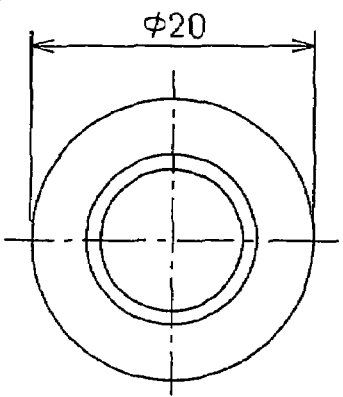
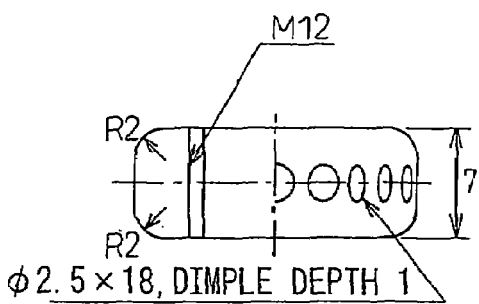

PIERCING METHOD AND PIERCING APPARATUS USING HYDROFORMING AND HYDROFORMED PART AND STRUCTURE

TECHNICAL FIELD

The present invention relates to a method used for the production of exhaust system parts, suspension system parts, body system parts, etc. for automobiles which places a metal pipe in a mold, clamps the mold, then applies inside the pipe an internal pressure and a pushing force in the pipe axial direction so as to form a predetermined shape by hydroforming during which shaping using a pierce punch assembled inside the mold to pierce the metal pipe, to a mold for the same, to a hydroformed part worked by the same, and to a structure of worked parts joined together.

BACKGROUND ART

In recent years, hydroforming technology has been the focus of attention in the automobile field as one of the means for reducing the number of parts and thereby cutting costs, for lightening the weight, etc. In Japan as well, it began to be applied to actual cars starting in 1999. Since then, the parts which can be hydroformed have increased. The market has greatly expanded in size.

There are many advantages to hydroforming other than the above reduction of the number of parts and the lightening of the weight. For example, the fact that piercing of a metal pipe is possible at the same time as hydroforming may be mentioned. An outline of that technology is as shown in FIG. 1. In this technology, a pierce punch 6 assembled into the hydroforming mold (in the case of this example, the upper mold 2) is being pushed in the direction of the mold cavity, so a hole is formed in the hydroformed part 1. At that time, the high pressure internal pressure causes the hydroformed part 1 to be pushed against the mold 2, so the edges of the hole will almost never droop down to the inner surface side and a good cut surface can be obtained. Further, the pierced metal piece 7 is sometimes completely punched out as shown in FIG. 1(a), but sometimes, as shown in FIG. 1(b), part is not cut and the piece left. Specifically, by partially making larger the chamfering of the edges of the front end of the pierce punch, cutting of that location is prevented.

There are many advantages to hydroforming as mentioned above, but as a defect, the point that joining with other parts is difficult may be mentioned. In the case of a conventional press formed part, it has been fastened to another part 11 by spot welding such as shown in FIG. 2(a) or bolting such as shown in (b). However, a hydroformed part is hollow, so spot welding was difficult. Further, attachment of a nut inside was also impossible. As shown in FIG. 3, the hydroformed part 1 may have a nut 13 welded to its outer surface side, but the nut 13 sticks out from the outer surface side of the hydroformed part 1, so when joined with another part 11, the parts cannot contact each other at their surfaces.

As an example of attachment of a nut to a hydroformed part, there is Japanese Patent Publication (A) No. 2002-45926. As shown in FIG. 4, this method performs the hydroforming by wrapping around the outer surface of the hydroformed part 1 a short pipe member 61 having a bag nut 60 attached to it.

Further, as another example of attaching a nut to the hydroformed part, there is Japanese Patent Publication (A) No. 2003-334625 as shown in FIG. 5. The main difference between the present method and the above-mentioned Japanese Patent Publication (A) No. 2002-45926 is the point that the nut 13 is sandwiched between the short pipe member 61 and the hydroformed part 1.

Further, as other prior art, there is Japanese Patent Publication (A) No. 2005-297060. This method, as shown in FIG. 6, is a method which forms a burled part 62 at the inner surface side of the hydroformed part, takes the part out from the hydroforming mold, then cuts a tap 63 at the burled part and uses a bolt 64 to join the part with another part 65.

DISCLOSURE OF THE INVENTION

However, in the technology of Japanese Patent Publication (A) No. 2002-45926, it is necessary to attach the bag nut and short pipe member by welding etc. before hydroforming. However, when hydroforming in the state with the short pipe member wrapped around the part, shaping of that location becomes extremely difficult and the danger of bursting, wrinkles, or other shaping defects occurring during the hydroforming rises. Therefore, this technology is also limited in applicable shapes of hydroformed parts. Conversely, to enable hydroforming, sometimes the length of the nut has to be shortened, so the fastening strength with the bolt sometimes might not be able to be sufficiently secured.

Further, the technology of Japanese Patent Publication (A) No. 2003-334625 has similar problems to Japanese Patent Publication (A) No. 2002-45926 in the point that a short pipe member is required, the point that hydroforming becomes difficult, and the point that there is a possibility of the nut length becoming shorter.

Further, when using the technology of Japanese Patent Publication (A) No. 2005-297060, cutting a tap is necessary after the hydroforming process. This is not efficient as a production process. Further, the present method directly cuts a tap at the hydroformed part, so cannot be applied when the shaped part is thin walled.

The present invention has as its object the provision of a working method and mold which, as explained above, are designed to eliminate the short pipe member required in the past when attaching a bolting nut to a hydroformed part, prevent an increase in the difficult of hydroforming due to the attachment of the nut, increase the length of the nut so as to secure sufficient strength at the time of bolting, and also enable application to a thin wall hydroformed part and to a worked part and a structure obtained by the same.

To solve this problem, the gist of the present invention is as follows:

(1) A piercing method using hydroforming comprising inserting a metal pipe into a split mold having a pierce punch able to be moved perpendicular to an axis of the inserted metal pipe or in a slanted direction, having a front part narrower than a center part, and having around the front part a nut having an inside diameter larger than an outside diameter of the front part and smaller than an outside diameter of the center part; applying to the metal pipe an internal pressure and pipe axial direction pushing force or an internal pressure for hydroforming; making the pierce punch advance to pierce part of the metal pipe by a front part of the pierce punch; then making the nut advance while pushing the center part arranged behind the nut; and pushing the surroundings of the pierced hole to the inner surface side of the metal pipe and embedding the nut in the metal pipe.

(2) A piercing device in a hydroforming apparatus having a split mold to which a metal pipe is attached and an internal pressure imparting means and axial pushing means, the hydroforming piercing apparatus characterized by having a pierce punch able to be moved perpendicular to an axis of the inserted metal pipe or in a slanted direction, having a front part narrower than a center part, and having around the front part a nut having an inside diameter larger than an outside diameter of the front part and smaller than an outside diameter of the center part, the pierce punch having the function of piercing the metal pipe by its front part together with advancing motion, then pushing the surroundings of the pierced hole by the nut to the inner surface side of the metal pipe and embedding the nut in the metal pipe.

(3) A hydroforming piercing apparatus as set forth in (2) characterized by having a secondary punch around a front part of the pierce punch and at an intermediate part between the nut and the pierce punch.

(4) A hydroformed part having an opening part at a side wall of a metal pipe, the hydroformed part characterized in that the opening part has a burled part projecting out to an inner surface side of the metal pipe and in that the burled part has a nut embedded in it at its inner side.

(5) A hydroformed part as set forth in (4) characterized in that the nut has a horizontal cross-sectional shape of a polygonal or elliptical shape or the nut has a horizontal cross-sectional shape of a contour of a combination of lines and curves or a combination of curves.

(6) A hydroformed part as set forth in (4) or (5) characterized in that the nut has a horizontal cross-sectional shape differing in an axial direction of the nut.

(7) A hydroformed part as set forth in any one of (4) to (6) characterized in that the nut as a whole is embedded at an inner surface side of the pipe from the outer surface of the metal pipe.

(8) A hydroformed part as set forth in any one of (4) to (7) characterized in that the burled part has a hole at its front end of a size smaller than the outside diameter of the nut and in that the burled part covers up to the edges of the nut at the inner surface side.

(9) A hydroformed part as set forth in any one of (4) to (8) characterized in that the nut has concave or convex dimples at its side surface.

(10) A hydroformed part as set forth in any one of (4) to (9) characterized in that the nut and metal pipe are welded together.

(11) A structure characterized by being integrally bolted with a hydroformed part as set forth in any one of (4) to (10).

According to the present invention, it is possible to eliminate the short pipe member which became necessary in the past when attaching a bolting nut to a hydroformed part, to prevent an increase in the difficulty of hydroforming due to the attachment of a nut, to lengthen the length of the nut to enable a sufficient strength to be secured at the time of bolting, and enable application to a thin wall hydroformed part. Due to this, bolting with other parts after hydroforming becomes easy, and the range of auto parts to which hydroforming can be applied is expanded. As a result, automobiles becomes lighter in weight which leads to an improvement in fuel economy and also contributes to improvement of the global environment. Further, the conventionally required short pipe member can be eliminated, so this can also contribute to a reduction of the costs.

BRIEF DESCRIPTION OF THE DRAWINGS

FIG. 2 gives explanatory views of a conventional method of joining a press formed part and other part.

FIG. 6 gives explanatory views of a method of burling a hydroformed part to directly tap it taken from Japanese Patent Publication (A) No. 2005-297060.

FIG. 8 gives explanatory views of a method using a secondary piece punch in the method of attaching an embedded nut to a hydroformed part of the present invention. (a) shows the state before piercing, (b) after piercing, (c) after being embedded, and (d) after completion.

FIG. 9 gives explanatory views of a hydroformed part with a nut embedded in it of the present invention and a structure with the hydroformed part bolted to another part. (a) shows the state after being embedded (cross-sectional view shows the cross-section A-A of the view of the appearance), while (b) shows the state after bolting (cross-sectional view shows the cross-section A-A of the view of the appearance)

FIG. 10 shows examples of the horizontal cross-sectional shape of an embedded nut of the present invention. (a) shows a hexagonal shape, (b) an elliptical shape, (c) a combination of lines and curves, (d) a combination of curves.

FIG. 11 shows examples of the longitudinal cross-sectional shape of an embedded nut of the present invention. (a) shows an example where the pipe inner surface side is larger in diameter, (b) where the pipe inner surface side is smaller in diameter, (c) where the center part is larger in diameter, (d) where the center part is smaller in diameter, (e) where the inner surface side is formed with a flange, and (f) where the side surface is formed with grooves.

FIG. 12 gives explanatory views of the present invention in the case where the surface of the embedded nut at the pipe outer surface side is embedded at the inner surface side from the outer surface of the hydroformed part. (a) shows the case where there is a cut-in part at the pipe outer surface side, while (b) shows the case where there is a crushed cut-in part.

FIG. 13 is an explanatory view of the present invention in the case where the size of the hole at the front end of the burled part is smaller than the outside diameter of the nut.

FIG. 14 shows an example of the working method for obtaining a structure where the size of the hole at the front end of the burled part becomes smaller than the outside diameter of the nut. (a) shows the state before piercing, (b) after piercing, (c) after being embedded, and (d) after completion.

FIG. 15 gives explanatory views of an embedded nut dimpled at the side surface of the present invention. (a) shows concave dimples, while (b) shows convex dimples.

FIG. 16 is an explanatory view of the present invention in the case of fastening an embedded nut and a hydroformed part by welding. The cross-section shows the cross-section A-A of the view of the appearance.

FIG. 19 gives explanatory views of an embedded nut used for the embodiments. (a) shows a circular cross-section, (b) an elliptical shape, (c) a circular barrel shape, and (d) a circular shape with a side surface with dimples.

BEST MODE FOR CARRYING OUT THE INVENTION

Figure 7:
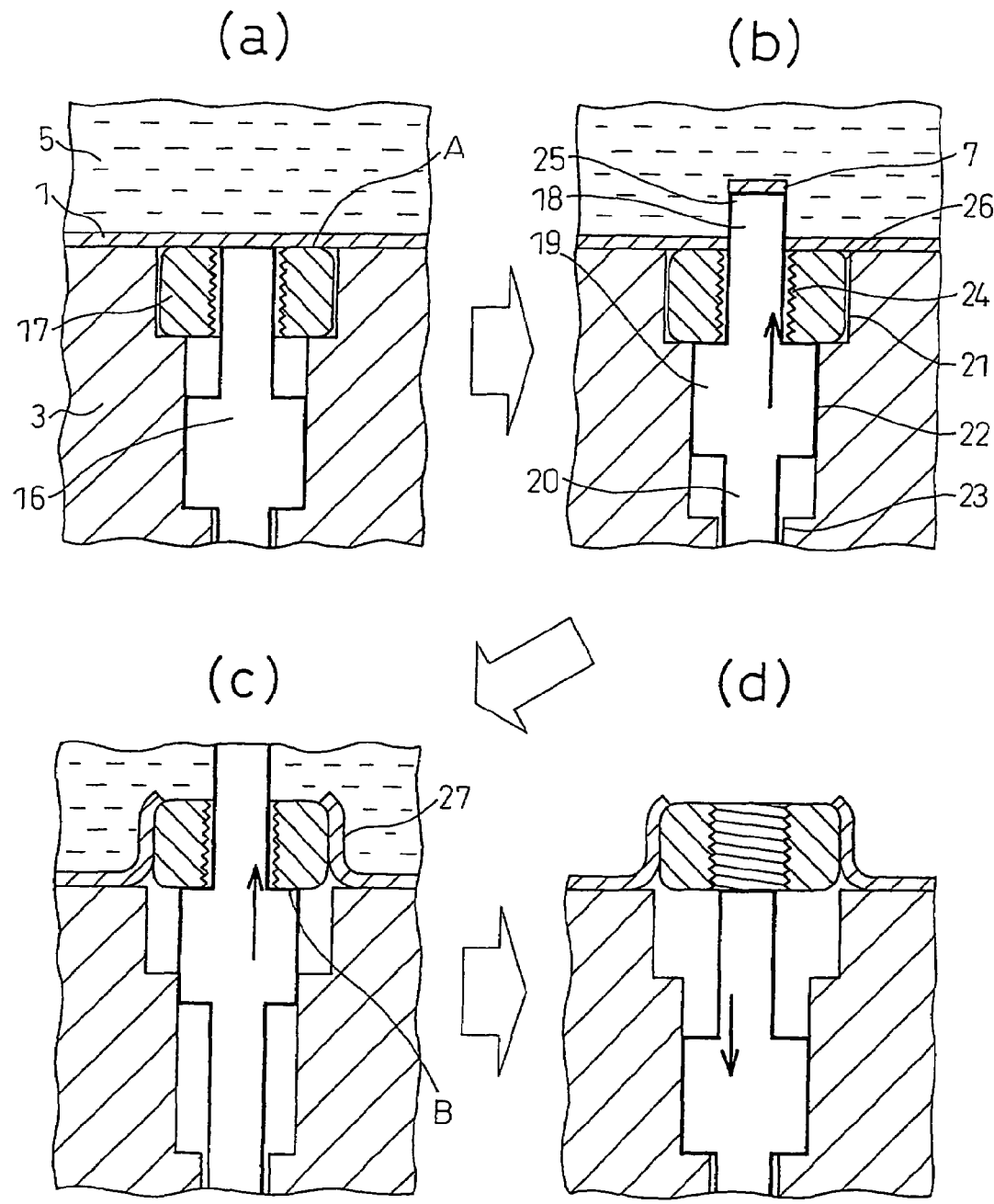
FIG. 7 gives explanatory views of a method of attaching an embedded nut to a hydroformed part of the present invention. (a) shows the state before piercing, (b) after piercing, (c) after being embedded, and (d) after completion.

In the present invention, first the usual hydroforming is performed. The "usual hydroforming" is the method of mounting a pipe material between an upper mold and a lower mold, filling the inside of the pipe material with water or another pressurizing medium, raising the pressure, and simultaneously if necessary pushing in the material in the axial direction from the pipe end by an axial pushing punch so as to form the pipe material into a shape following the inner surfaces of the upper mold and lower mold. FIG. 7 shows the process of using the usual hydroforming to shape a hydroformed part 1, then embed a nut 17 from the lower mold 3. In this example, a nut 17 having an inside diameter larger than an outside diameter of a front part 18 of a later mentioned pierce punch 16 and smaller than an outside diameter of a center part is embedded in the hydroformed part 1 from the direction of the lower mold 3. Just that location is shown enlarged. After this, the figure will be used to explain the details of the present invention. Note that in the following explanation, the "top surface" means the surface at the top of the figure, while the "bottom surface" means the surface at the bottom of the figure. That is, when piercing from the top to the bottom of the paper surface, the top surface and bottom surface become reversed.

Inside the lower mold 3, a primary pierce punch 16 is assembled. The primary pierce punch 16 is structured, from the top in the figure, by a small diameter front part 18, a large diameter center part 19, and a small diameter rear end 20. Further below the rear end 20, a cylinder is set (not shown). The cylinder can be used to raise the primary pierce punch 16 in this structure. Note that in this example, a small diameter rear end 20 was provided, but it is also possible to omit this and directly push the lower surface of the larger diameter center part 19 by the cylinder.

The shape of the hole provided at the lower mold 3 is structured changing in inside diameter in three stages. From the top of the figure, the front part 21, center part 22, and rear part 23 become narrower in inside diameter the further downward. The inside diameter of the center part 22 and the outside diameter of the above-mentioned center part 19 of the primary pierce punch become substantially equal. The primary pierce punch 16 rises from the reference location. Note that the center part 22 has a depth larger than a height of the center part 19 of the primary pierce punch. Further, the inside diameter of the rear part 23 is designed to be larger than the outside diameter of the above-mentioned rear end 20 of the primary pierce punch.

The state of FIG. 7(a) shows the middle of hydroforming. This is the state where the inside of the pipe is subjected to a high pressure by the pressurizing medium 5 and the hydroformed part 1 is stuck to the surface of the lower mold 3. At this point of time, the bottom surface of the center part 19 of the primary pierce punch and the upper surface of the rear part 23 of the lower mold hold contact each other. Even in a state where hydroforming results in internal pressure being applied, the primary pierce punch 16 is designed not to descend lower than that position. Note that the front part 18 of the primary pierce punch is arranged passing through the center hole part of the ring-shaped embedded nut 17, while the top surface of the front part 18 of the pierce punch becomes the same height as the surface of the lower mold 3.

The outside diameter of the embedded nut 17 is made smaller than the inside diameter of the front part 21 of the lower mold hole, while the height is made equal to the depth of the front part 21 of the lower mold hold. Further, the inside of the embedded nut 17 is formed with a tap 24. The peaks of the tap 24 have an inside diameter set larger than the outside diameter of the above-mentioned front part 18 of the primary pierce punch. If setting such dimensions, in the state of FIG. 7(a), the embedded nut 17 becomes placed at the position of the top surface of the center part 22 of the lower mold hole and, further, the position of the top surface A of the embedded nut 17 becomes equal to the positions of the surface of the lower mold 3 and the top surface of the front part 18 of the primary pierce punch.

Figure 1:
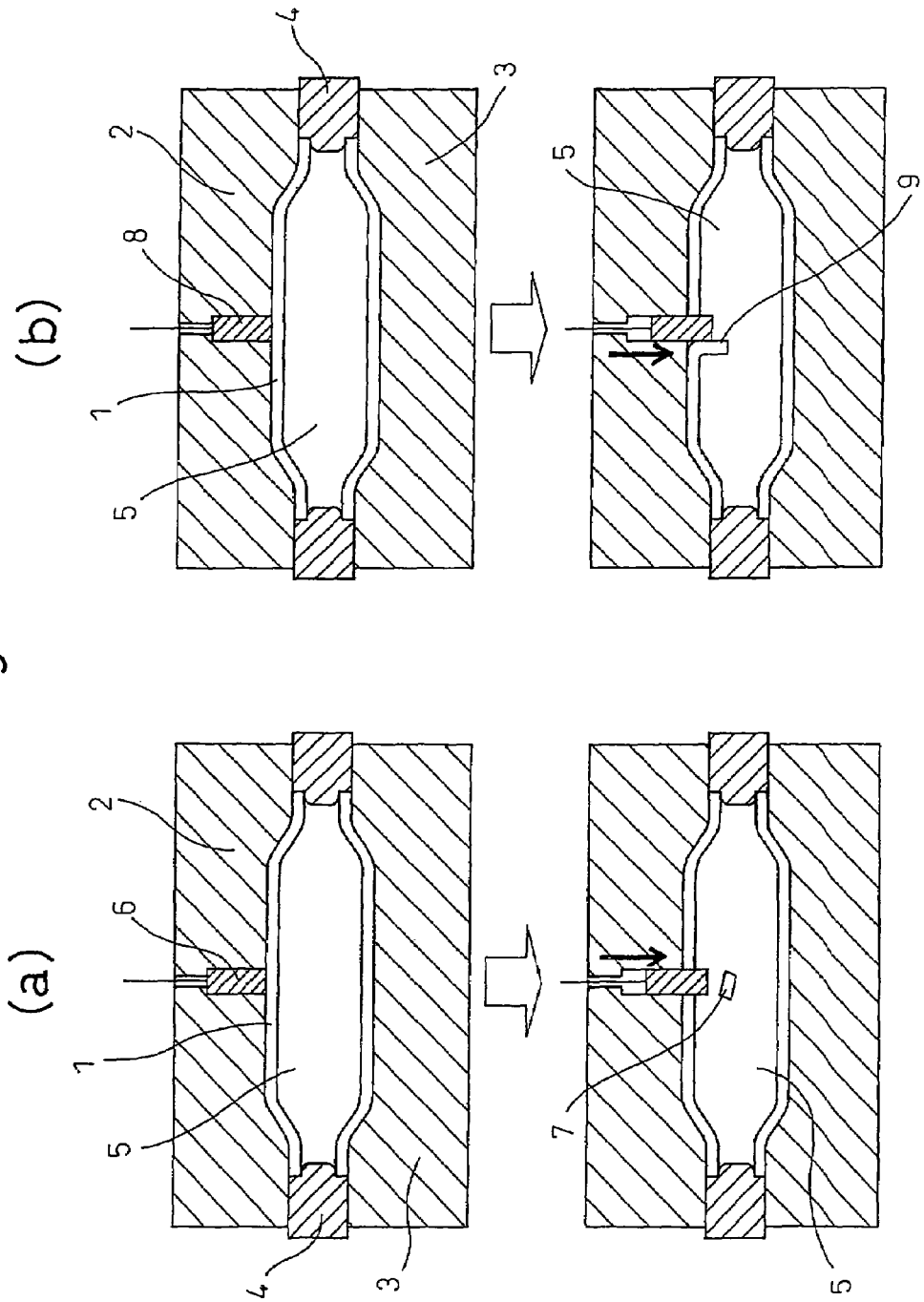
FIG. 1 gives explanatory views of a conventional piercing method.
Figure 3:
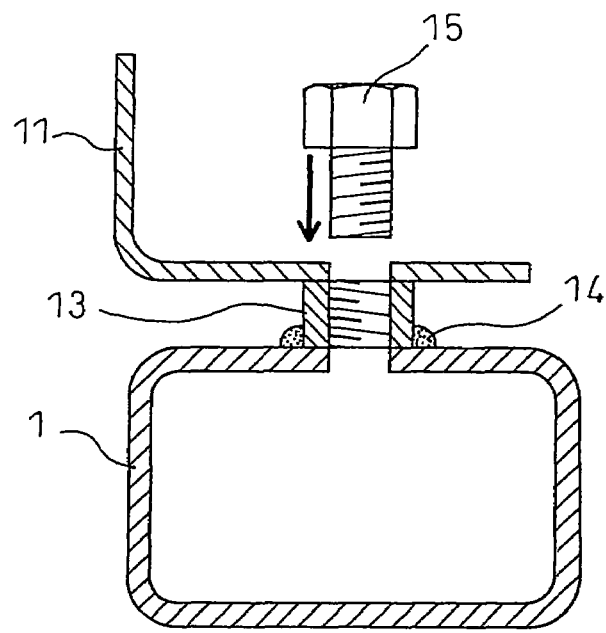
FIG. 3 is an explanatory view of the case of welding a nut to the outside of a conventional hydroformed part and bolting the part to another part.
Figure 4:
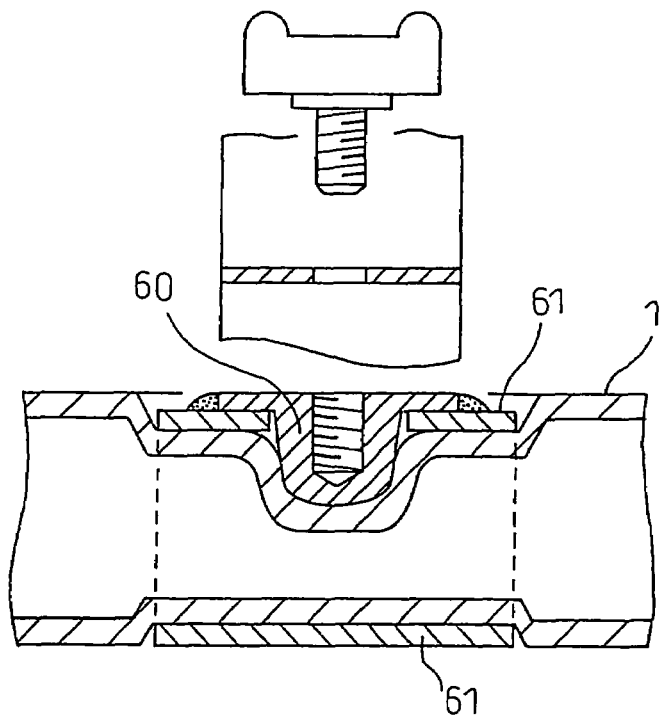
FIG. 4 is an explanatory view of the method of attaching a nut to a hydroformed part taken from Japanese Patent Publication (A) No. 2002-45926.
Figure 5:
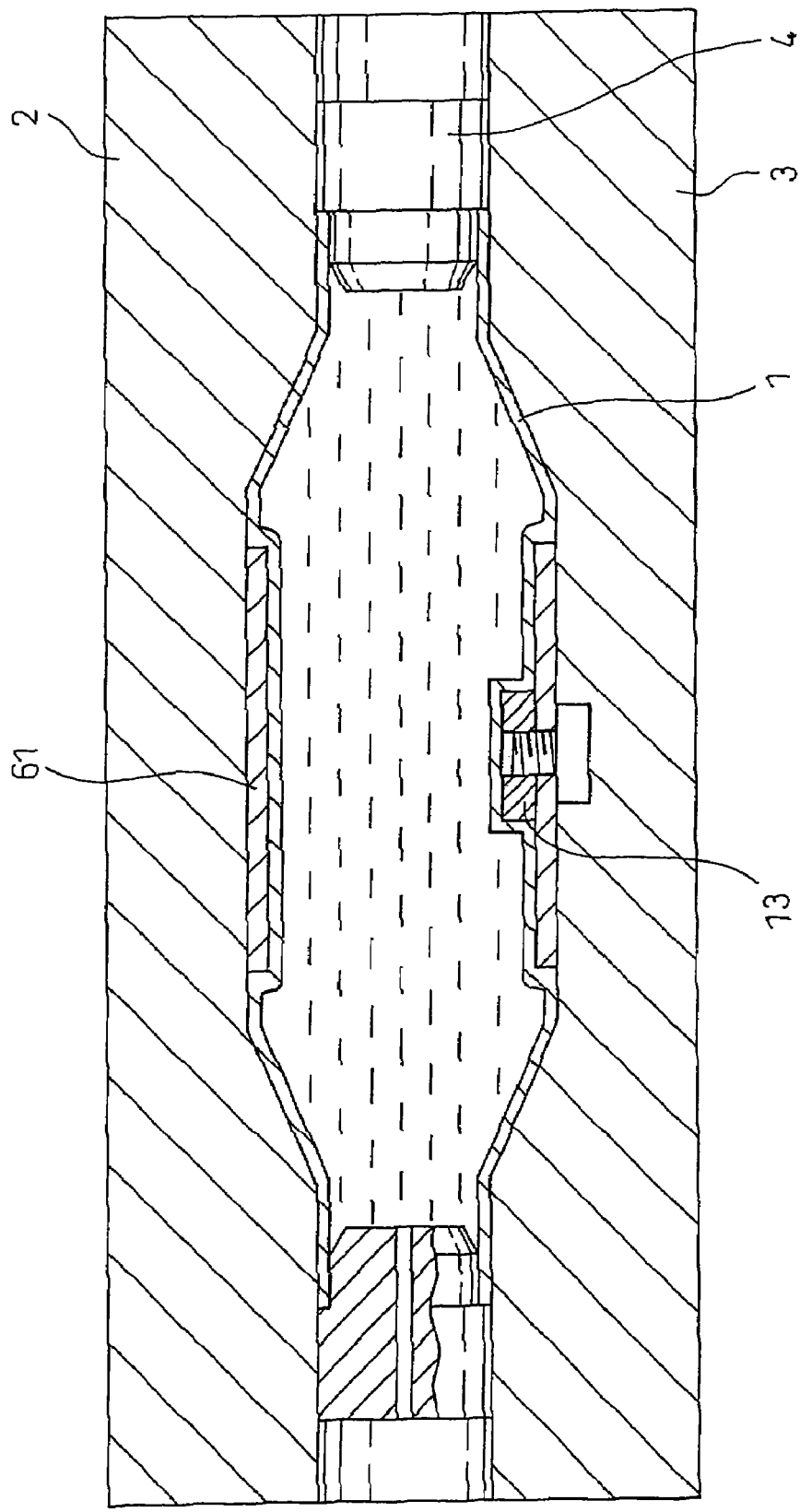
FIG. 5 is an explanatory view of a method of attaching a nut to a hydroformed part taken from Japanese Patent Publication (A) No. 2003-334625.

Next, as shown in FIG. 7(b), while holding the inside of the hydroformed part 1 at a high pressure as it is, the front part 18 of the primary pierce punch 16 is made to rise (advance) through the embedded nut 17. The edges 25 of the top surface of the front part 18 of the primary pierce punch are not chamfered, but are left sharp. For this reason, the metal piece 7 where the hydroformed part 1 was pierced is separated. The so-called "piercing" explained in FIG. 1(a) is therefore performed.

As shown in FIG. 7(c), further, if making the primary pierce punch 16 rise, since the center part 19 of the primary pierce punch is larger in size than the front part 18 of the primary pierce punch, the top surface of the center part 19 of the primary pierce punch pushes the embedded nut 17 upward. However, the edges 26 of the top surface (inner surface side) of the embedded nut 17 are chamfered, so even if pushed into the hydroformed part 1, it will not be pierced. This is the same result as explained in FIG. 1(b). This is because if the chamfering of the edges of the front end of the pierce punch is large, the hydroformed part 1 will not be sheared. As a result, along with the rise of the embedded nut 17, the hole of the hydroformed part 1 formed by the above-mentioned step (b) will be pushed wider and the hydroformed part 1 will be formed with a burled part 27 at the inner surface side.

Further, if, as shown in FIG. 7(c), setting the final height by which the primary pierce punch 16 rises so that the top surface of the center part 19 becomes exactly the same height as the surface of the lower mold, the bottom surface B of the embedded nut 17 becomes the same position as the outer surface of the hydroformed part 1.

Finally, if, as shown in FIG. 7(d), retracting the primary pierce punch 16 downward, only the embedded nut 17 will remain in the burled part 27. Note that there are several types of timings for retracting the primary pierce punch 16. For example, if maintaining the internal pressure while retracting the primary pierce punch 16, the inside water will automatically leak and the internal pressure will drop. This method is preferable in terms of cycle time, but there is a problem with splattering of water etc. On the other hand, if making the internal pressure drop, then retracting the primary pierce punch 16, the water will not easily splatter, but the cycle time will become longer. Further, it is also possible to take out the hydroformed part 1 from the lower mold 3, then make the primary pierce punch 16 retract. In this case, caution is necessary that the tap 24 of the embedded nut 17 not be damaged when taking out the hydroformed part 1. However, in the case of the present invention, the drive direction of the primary pierce punch 16 need only be upward. When making the punch retract, it is possible to push it in manually, by a robot, etc. after taking out the hydroformed part 1. In particular, when continuously working parts, it is necessary to set the embedded nuts 17 for the next working operation, so the primary pierce punch 16 also may be pushed in downward at that time.

The above series of explanations given using FIG. 7 are for the case where the only pierce punch is the primary pierce punch 16. However, the primary pierce punch 16 has to pierce the first hydroformed part 1, so material-wise often uses tool steel or another extremely hard material. On the other hand, for the nut, usually soft steel is used. Therefore, the bottom surface of the embedded nut 17 may be pushed in by the top surface of the center part 19 of the primary pierce punch and become concave. To prevent this, as shown in FIG. 8, it is sufficient to add a secondary pierce punch 28 between the embedded nut 17 and the center part 19 of the pierce punch. The secondary pierce punch 28 has an outside diameter substantially equal to the inside diameter of the front part 21 of the hole of the lower mold. Its height, together with the height of the embedded nut 17, is made the same as the depth of the front part 21 of the hole of the lower mold. The material is preferably hard and will not become concave by being pushed in by the top surface of the center part 19 of the primary pierce punch. Further, the secondary pierce punch 28 and embedded nut 17 contact each other over a wide area, so the risk of a concave part forming in the nut 17 is reduced. Further, if preparing several types of heights of secondary pierce punches 28, even if the height of the embedded nut 17 changes, this can be easily handled by changing the primary pierce punch 16 or the shape of the hole of the lower mold 3.

If using the above piercing apparatus for working, for example, as shown in FIG. 9(a), the hydroformed part 1 is formed with a burled part 27 at its inner surface side and that location may have an embedded nut 17 attached to it. That is, without attaching the short pipe member required in the prior art of Japanese Patent Publication (A) No. 2002-45926 or Japanese Patent Publication (A) No. 2003-334625, a hydroformed part in which a nut is embedded can be obtained. Further, in the present invention, the hydroforming is completed before embedding the nut, so the difficulty of hydroforming will not be increased due to embedding the nut.

If fastening another part 11 to the above obtained hydroformed part in which the nut is embedded by a mounting bolt 29, the structure as shown in FIG. 9(b) is obtained. In the present invention, as explained above, the difficulty of hydroforming is not increased, so the embedded nut can be freely changed in height. Accordingly, to increase the bolting strength, it is easy to increase the height of the embedded nut so as to increase the effective thread length. Further, at the location where the embedded nut 17 is attached, a hole is formed passing through the hydroformed part 1, so the mounting bolt 29 can be inserted passing through to the inside of the hydroformed part 1. Accordingly, in terms of the effective thread length by which the mounting bolt 29 and embedded nut engage as well, the invention is more advantageous than the prior art of Japanese Patent Publication (A) No. 2002-45926 and Japanese Patent Publication (A) No. 2003-334625. Further, in the present invention, the thickness of the embedded nut 17 can also be freely changed, so the invention can also be applied to a thin walled hydroformed part to which the prior art of Japanese Patent Publication (A) No. 2005-297060 could not be applied.

In the present invention, the embedded nut 17 is attached to the hydroformed part 1 under a high internal pressure. Even with this alone, the embedded nut 17 and the hydroformed part 1 are strongly fit together. However, depending on the part, sometimes a stronger mounting strength is demanded, so below the method for increasing the mounting strength will be explained.

First, the strengthening method for preventing the embedded nut 17 from turning at the time of screwing in the bolt and after attachment with the other part will be explained. If the embedded nut 17 has a circular horizontal cross-section, it would easily turn, so embedded nuts 17 of the horizontal cross-sectional shapes shown in FIG. 10 would be effective. (a) of the figure is an example of a hexagonal embedded nut 30, but in addition to a hexagonal shape, an octagonal or other polygonal shape is also possible. However, when embedding and burling a hexagonal embedded nut 30, there is a danger of the hydroformed part 1 breaking at the locations of the hexagonal corners 31, so it is desirable to chamfer the hexagonal corners 31 by a very large amount. Further, in the case of a hexagonal embedded nut 30, it is possible to use a commercially available hexagonal nut as it is or one chamfered somewhat more at the corners, so this is cost advantageous.

(b) of the figure is an example of an embedded nut 32 of an elliptical horizontal cross-sectional shape. In the case of an elliptical shape, there are no corners like the case of a polygon, so there is the advantage of resistance to breakage at the time of burling. However, the cost of fabricating the nut becomes higher.

As opposed to this, (c) of the figure is an example of a nut 33 with a horizontal cross-sectional shape of a circular cross-section partially cut away. The effect is substantially the same as the case of an elliptical shape. Further, the cost of fabrication of the nut is also cheaper than the case of an elliptical shape. In this way, the contour of the horizontal cross-sectional shape may also be a shape of a combination of lines and curves.

Further, (d) of the figure is an example of an embedded nut 34 of a horizontal cross-sectional shape of a combination of curved contours. If the shape becomes complicated, this becomes disadvantageous in terms of the nut fabrication costs or breakage at the time of burling, but the effect of preventing the nut from turning becomes higher.

Next, an effective method for preventing the embedded nut 17 from detaching at the outer surface side or inner surface side of the hydroformed part 1 will be explained. As shown by the vertical cross-sectional shapes of nuts in FIG. 11, the horizontal cross-sectional shape of an embedded nut may be made a shape which is not constant in the axial direction. Specific examples will be explained below. (a) is an embedded nut 35 tapered so that the pipe inner surface side becomes larger in diameter than the pipe outer surface side. At the initial stage of embedding the nut 35, the burled part 27 is spread to a large diameter, but a high pressure is applied, so as the nut is embedded further to the inner surface side, the root part of the burled part 27 is constricted to a small diameter. As a result, the nut 35 is embedded by the shape such as in (a) and the nut 35 becomes resistant to detachment at the pipe outer surface side.

Conversely, if using an embedded nut 36 tapered so that the pipe inner surface side becomes smaller in diameter than the pipe outer surface side, the nut is structured to be resistant to detachment at the pipe inner surface side as shown in (b) of the figure.

Shapes provided with both the advantages of (a) and (b) are (c) and (d). (c) is an example of a barrel shaped embedded nut with a center part in the axial direction larger in diameter than the two end parts in the axial direction, while (d) is an example of an hourglass shaped embedded nut 38 with a center part of the embedded nut 38 smaller in diameter. In each case, the nut is structured to be resistant to detachment at the pipe inner surface side and outer surface side.

Further, the embedded nut need not continuously change in cross-section. As shown in (e), it may also be an embedded nut 39 with a step difference. In this example, a flange 40 is attached at the pipe inner surface side. The front end of the burled part 27 is structured to catch at the flange 40. The nut is therefore structured to be resistant to detachment at the pipe outer surface side.

Further, as shown in the example of (f), an embedded nut 41 provided at its side surface with grooves 42 at one location or a plurality of locations would also be effective. Naturally, not only grooves, but also projections can be expected to have similar effects.

Next, the method of preventing detachment at the pipe outer surface side by the position of the embedded nut 17 will be explained. As shown in FIG. 12(a), the embedded nut 17 is embedded until the surface B of the nut at the pipe outer surface side is positioned at the pipe inner surface side from the outer surface of the hydroformed part 1. If doing so, the internal pressure acts to provide a cut-in part 43 at the root of the burled part 27, so the nut is structured to be resistant to detachment at the pipe outer surface side. Further, as shown by (b) of the figure, if using a mounting bolt 29 to join with another part 11, when fastening the mounting bolt 29, the cut-in part 43 is crushed, so the nut is structured to become further resistant to detachment.

Conversely, an example of leaving the front end 44 of the burling at the pipe inner surface side of the embedded nut 17, making the size of the hole at the front end of the burled part smaller than the outside diameter of the nut, and using the burled part to cover the edges 26 of the nut at the inner surface side is shown in FIG. 13. If made such a structure, the embedded nut 17 will become resistant to detachment at the pipe inside surface side. Further, compared with the case of expanding the hole size of the front end of the burled part to the outside diameter of the embedded nut 17, the rate of expansion of the pierced hole becomes lower, so this is advantageous when the rate of hole expansion of the material of the hydroformed part 1 is low.

In the above way, to prevent the front end 44 of the burling from being spread to the outside diameter of the embedded nut 17, it is sufficient to lower the height of the embedded nut 17. However, in this case, the fastening strength of the thread also ends up falling, so a method for obtaining the structure shown in FIG. 13 while leaving the height of the embedded nut 17 high will be explained next. As shown in FIG. 14(a), at the point of time of hydroforming before piercing, the top surfaces A of the primary pierce punch 16 and embedded nut 17 are set to a state sticking out from the inner surface of the lower mold 3 to the pipe inner surface side. Such a sticking out state can be achieved by for example setting the depth of the front part 21 of the hole of the lower mold smaller than the height of the embedded nut 17, setting the lengths of the front part 18 of the primary pierce punch and secondary pierce punch 28 high, etc. In that state, the part is pierced as shown in (b), then is burled as shown in (c) to embed the embedded nut 17 in the hydroformed part 1. In the step of (c), the rising stroke of the pierce punch can be set smaller, so the rate of expansion of the pierced hole becomes smaller. As a result, as shown in (d), the structure as shown in FIG. 13 is obtained even when the height of the embedded nut 17 is high.

Further, FIG. 15 shows an example of provision of dimples at the side surface of the embedded nut. (a) is an example of an embedded nut 45 given concave dimples 46, while (b) is an example of an embedded nut 47 given convex dimples 48. In both cases, if providing the nut side surface with dimples, rotation of the embedded nut can also be suppressed and detachment to the inside surface side and outside surface side of the pipe can also be suppressed.

If using such a means, the embedded nut 17 will become resistant to detachment from the hydroformed part 1, but to further firmly fasten it, as shown in FIG. 16, after being embedded, it is effective to weld together the embedded nut 17 and hydroformed part 1. The welding may be performed by circular welding as illustrated, but welding at just several points is also effective. The welding method may also be MIG, TIG, or other arc welding or may be laser welding.

EMBODIMENTS

Figure 17:
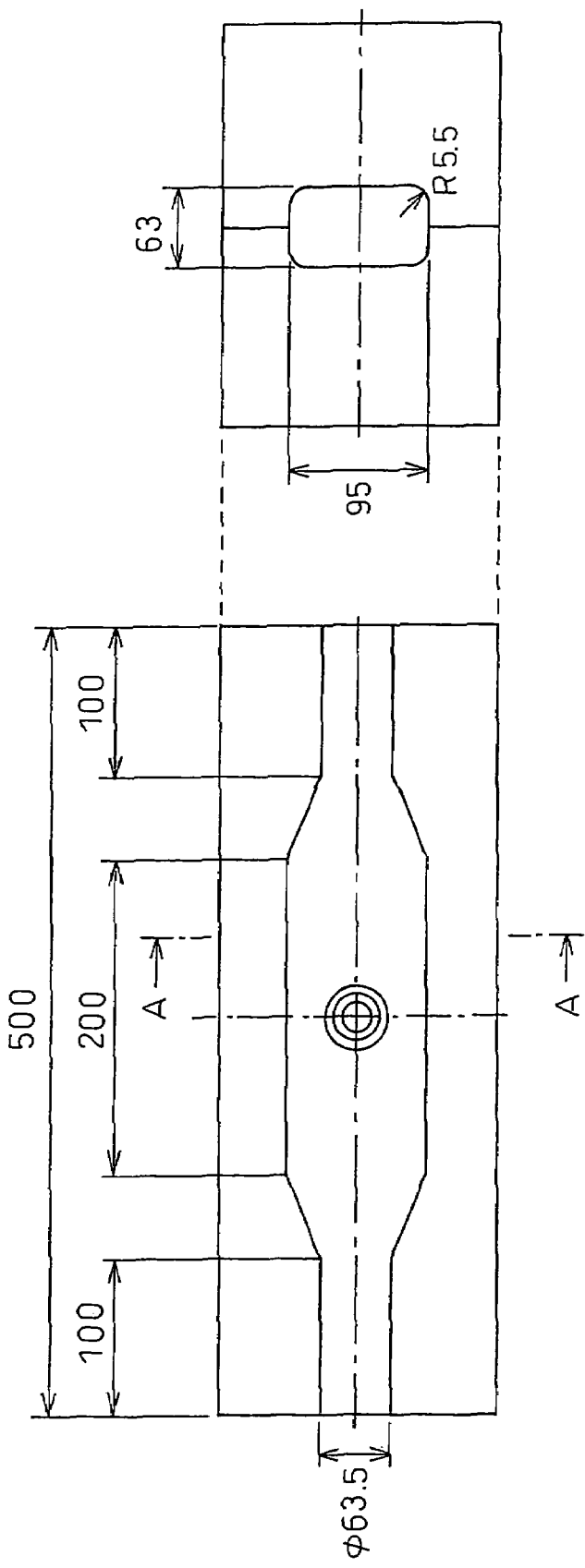
FIG. 17 is an explanatory view of a hydroforming mold used for the embodiments.
Figure 18:
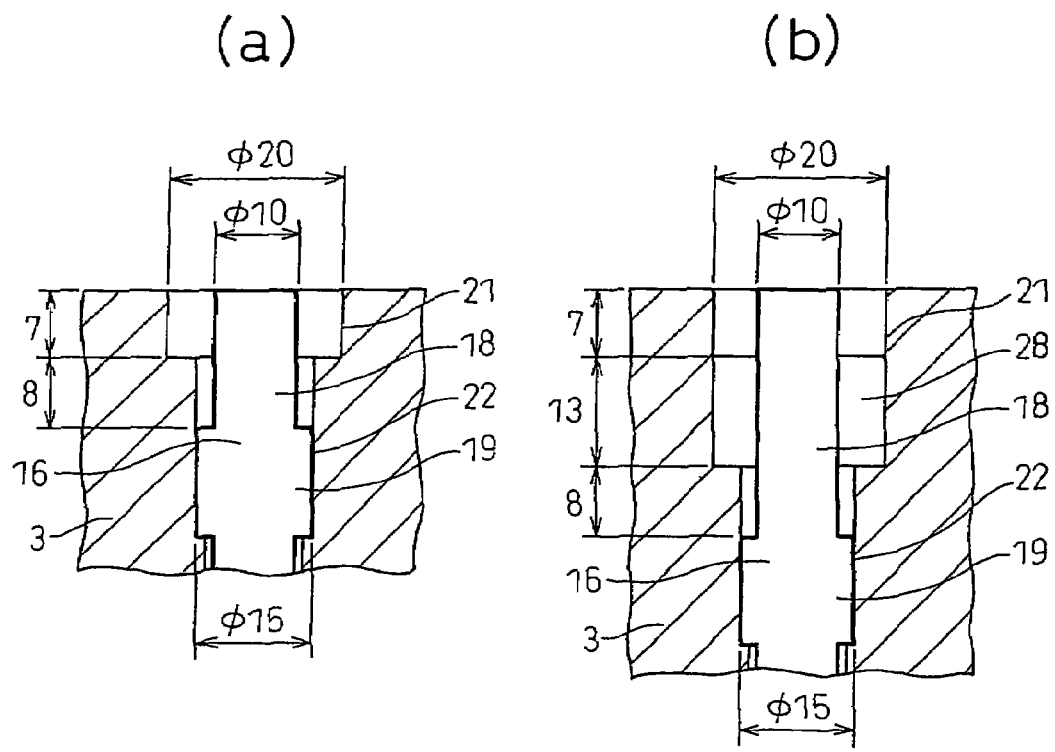
FIG. 18 is an explanatory view of the structure of a piece punch assembled into a hydroforming lower mold used for the embodiments. (a) shows the case of only a primary pierce punch, while (b) shows the case where there is also a secondary pierce punch.

For the base pipe, steel pipe of an outside diameter of 63.5 mm, a wall thickness of 2.3 mm, and a total length of 490 mm was used. For the steel type, STKM13B of carbon steel pipe for machine structures was employed. The mold used for the hydroforming has a shape for enlarging the pipe to the long cross-sectional shape as shown in FIG. 17. The pierce punch was assembled at the center of the lower mold 3. This structure is shown in FIG. 18. The tests were run for two types of cases of the case (a) of not using a secondary pierce punch 28 and the case (b) of using one. In both cases, the outside diameter of the front part 18 of the primary pierce punch was made 10 mm, the outside diameter of the center part 19 was made 15 mm, the inside diameter of the front part 21 of the hole of the lower mold was made 20 mm, and the inside diameter of the center part was made 15.10 mm. Further, the stroke of the primary pierce punch 16 from the initial position to the bottom surface of the embedded nut 17 or secondary pierce punch 28 was made 8 mm. The depth of the front part 21 of the hole of the lower mold was made 7 mm in the case of (a) of no secondary pierce punch 28 and was made 20 mm (=7 mm+secondary pierce punch height 13 mm) in the case of (b) with a secondary pierce punch 28. Further, the stroke after contacting the bottom surface of the embedded nut 17 or secondary pierce punch 28 was made 7 mm. That is, at the final point of time, both in the case of (a) and (b), the bottom surface of the embedded nut 17 is set to become exactly equal to the height of the outer surface of the hydroformed part 1. Note that as the steel type of the mold, for the upper mold 2 and lower mold 3, S50C was selected, for the primary pierce punch 16, SKH51, and for the secondary pierce punch 28, SKD11.

For the shape of the embedded nut, the four types such as shown in FIG. 19 were used. (a) is a basic shape comprised of a cylindrical shape with a 20φ circular cross-section, (b) is a cylindrical shape with a 20 mm×18 mm elliptical cross-section, (c) is a barrel shape with a bulging center in circular cross-section, and (d) is a shape the same as (a) and given 2.5φ dimples at its surface. In each case the nut height was 7 mm and an M12 tap was cut at the center M12.

The above base pipe and working device (mold) were used to run tests to embed various types of nuts into hydroformed parts. As the hydroforming conditions, the parts were formed by a maximum internal pressure of 200 MPa and axial pushing amounts at the two ends of 50 mm. After forming, while holding the pressure at 200 MPa as is, the primary pierce punch 16 was pushed inside through the hole part of each embedded nut 17 to embed the nut in a hydroformed part 1. That is, first, the front part 18 of the primary pierce punch was used to pierce of a 10φ hole, the punch was raised as is by a stroke of 8 mm, then was raised together with the embedded nut 17 to widen the 10φ hole and embed each nut at the burling location. The rising stroke of the embedded nut 17 was made 7 mm, so finally the bottom surface of the embedded nut 17 and the outer surface of the hydroformed part 1 became equal in height.

As a result, the nut of each of FIG. 19(a) to (d) could be embedded in a hydroformed part 1 and the nut would not detach even when the part is taken out from the mold. While embedding the nut, the internal pressure did not fall much at all, so the shape of the hydroformed part 1 around the embedded part was good and no cracks formed at the burled part 27 either. Note that tests were run for the case where there was no secondary pierce punch and the case where there was, but in both cases the nuts could be embedded. However, when there is no secondary pierce punch, the surface of the nut showed some dents due to the primary pierce punch after working, so in the case of a part where the appearance is of a concern, it can be said to be desirable to provide a secondary pierce punch.

Even if changing the horizontal cross-section of the nut to the shape shown in FIGS. 10(a), (c), and (d) or the vertical cross-section to the shape such as shown in FIGS. 11(a), (b), and (d) to (f), the nut could be similarly embedded.

Next, a test was run embedding a nut of FIG. 19(a) by the same pierce structure as in FIG. 18(a) during which only the rising stroke of the embedded nut was changed from 7 mm to 10 mm. As a result, the surface B of the nut at the outer surface side of the steel pipe was embedded down to a position 3 mm above the outer surface of the hydroformed part 1 (see FIG. 12(a)). Further, as shown in FIG. 12(a), the burled part cut inward at the part below the nut.

Figure 20:
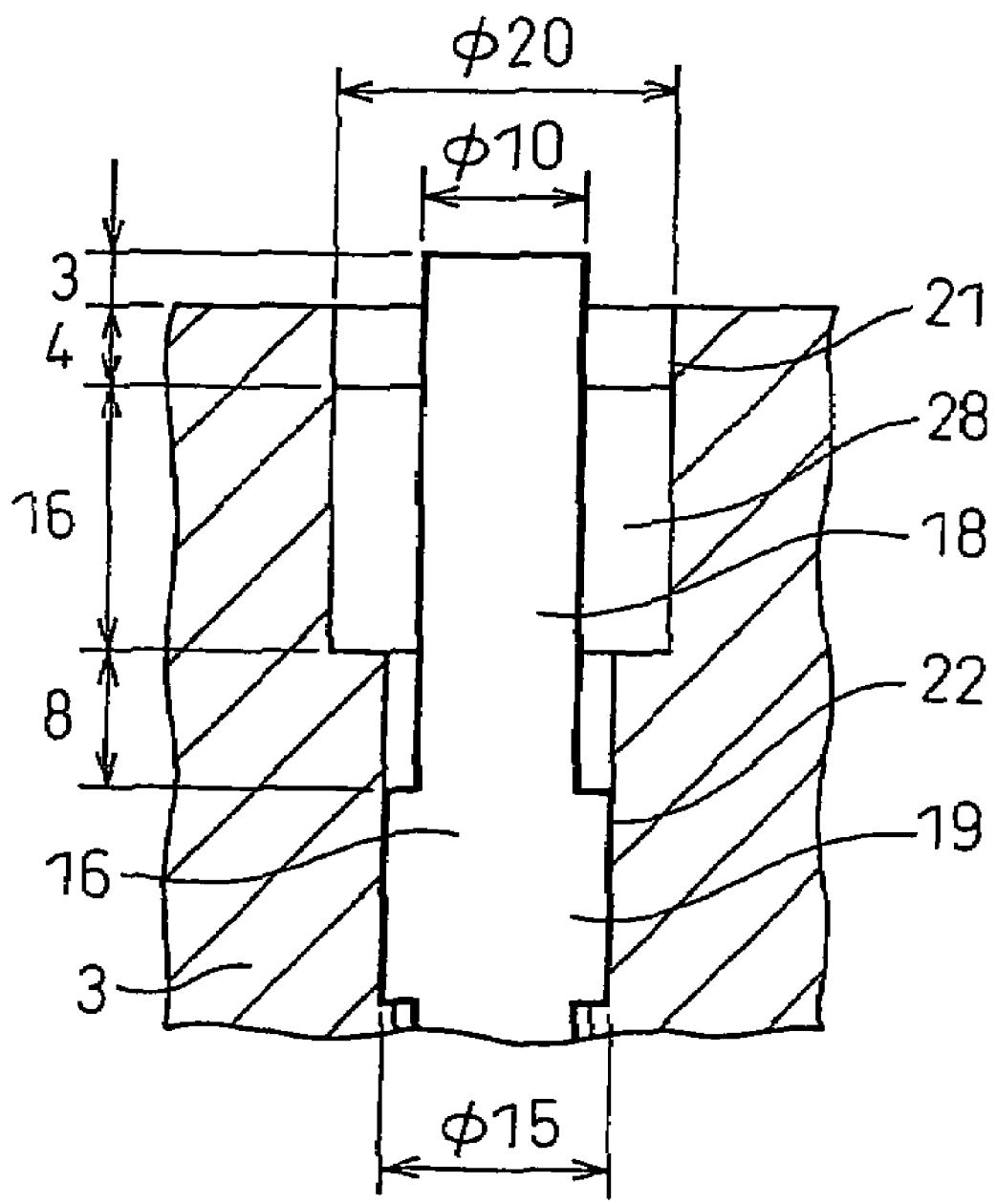
FIG. 20 is an explanatory view of the case where initially the nut surface sticks out into the mold in the structure of a piece punch assembled into a hydroforming lower mold used for the embodiments.

Further, a test was run embedding the nut of FIG. 19(a) by a pierce punch structure such as shown in FIG. 20. In this case, the front part 18 of the primary pierce punch and the secondary pierce punch 28 were increased in length by 3 mm, so in the initial state of setting the nut, the top surface of the nut was positioned 3 mm above the surface of the lower mold 3 (inner side of pipe). If this extent, the part could be shaped with changing the hydroforming conditions. After shaping, the pierce punch was pushed in to embed the nut, but the stroke of the embedded nut was set to 4 mm, so the final position of the lower surface of the nut became the same height as the outer surface of the hydroformed part 1. However, since only embedded by 4 mm, the hole was not widened completely to the nut size of 20φ and was stopped at 17φ. Accordingly, a structure was obtained in which the hole at the front end of the burled part was smaller than the outside diameter of the nut and in which the burled part covered the edges of the nut at the inner surface side and partially covered the top surface of the nut.

As explained above, in all cases, the nut could be embedded in the hydroformed part 1 without problem. Next, as an example of the other part, a steel sheet of a sheet thickness of 3 mm formed with a hole of 14φ was used and fastened with the above obtained hydroformed part with an embedded part by an M12×length 20 mm hexagonal bolt. As a result, in each above-mentioned case, the other part could be bolted without problem. Further, at one section of the hydroformed part with the nut of FIG. 19(a) attached to it, the nut and hydroformed part were circularly welded by TIG, while other sections were spot welded manually. The shaped part could be bolted with the other part without problem.

INDUSTRIAL APPLICABILITY

The present invention performs hydroforming by inserting a metal pipe into a mold and shaping it into a predetermined shape during which shaping process it uses a pierce punch assembled inside the mold to pierce the metal pipe and is particularly useful when working a hydroformed part used for the production of for example exhaust system parts, suspension system parts, body system parts, etc. of an automobile etc.

The invention claimed is:

1. A piercing method using hydroforming comprising inserting a metal pipe into a split mold having a pierce punch able to be moved perpendicular to an axis of said inserted metal pipe or in a slanted direction, having a front part narrower than a center part, having around said front part a nut having an inside diameter larger than an outside diameter of said front part and smaller than an outside diameter of said center part, and having a secondary punch around said front part of said pierce punch at a position between said nut and said center part of said pierce punch; applying to said metal pipe an internal pressure and pipe axial direction pushing force or an internal pressure for hydroforming; making said pierce punch advance to pierce part of said metal pipe by a front part of said pierce punch; then making said nut advance while pushing said center part and said secondary punch arranged behind said nut; and pushing the surroundings of the pierced hole to the inner surface side of said metal pipe and embedding said nut in the metal pipe.

2. A hydroforming piercing apparatus having a split mold to which a metal pipe can be attached and an internal pressure imparting means and axial pushing means, said hydroforming piercing apparatus characterized by having a pierce punch able to be moved perpendicular to an axis of said inserted metal pipe or in a slanted direction, having a front part narrower than a center part, having around said front part a nut having an inside diameter larger than an outside diameter of said front part and smaller than an outside diameter of said center part, and having a secondary punch around said front part of said pierce punch at a position between said nut and said center part of said pierce punch, said pierce punch having the function of piercing said metal pipe by its front part together with advancing motion, then pushing the surroundings of the pierced hole by said nut to the inner surface side of said metal pipe and embedding said nut in the metal pipe.

3. A hydroformed part comprising a metal pipe having an opening at a side wall of said metal pipe, said hydroformed part characterized in that said opening has a protruded part projecting into an inner surface side of said metal pipe, wherein said protruded part has a nut embedded therein, wherein said nut has a horizontal cross-sectional shape that varies in an axial direction of said nut.

4. A hydroformed part as set forth in claim 3 characterized in that said nut has a horizontal cross-sectional shape that is polygonal, is elliptical, has a contour of a combination of lines and curves, or has a contour of a combination of curves.

5. A hydroformed part as set forth in claim 4 characterized in that said nut has a hexagonal or octagonal horizontal cross-sectional shape.

6. A hydroformed part as set forth in claim 3 characterized in that said nut is completely embedded at said inner surface side of the metal pipe.

7. A hydroformed part as set forth in claim 3 characterized in that said protruded part has a front end at the pipe inner surface side having a hole of a size smaller than an outside diameter of said nut, wherein edges of said nut are covered with a portion of the protruded part at the inner surface side of said metal pipe.

8. A hydroformed part as set forth in claim 3 characterized in that said nut has concave or convex dimples at its outside surface.

9. A hydroformed part as set forth in claim 3 characterized in that said nut and metal pipe are welded together.

10. A structure characterized by being integrally bolted with a hydroformed part as set forth in claim 3.

11. A hydroformed part as set forth in claim 3, wherein said nut has a vertical cross sectional shape that is one selected from the group consisting of a) a tapered shape having a diameter of an inner surface end of said nut larger than a diameter of an outer surface end of said nut;

b) a tapered shape having a diameter of an outer surface end of said nut larger than a diameter of an inner surface end of said nut;

c) a barrel shape in which a diameter of a center portion of said nut larger than the diameter of either the inner surface end of said nut or the outer surface end of said nut; and d) an hour-glass shape in which said diameter of the center portion smaller than the diameter of either the pipe inner surface end or the pipe outer surface end.

\* \* \* \* \*